(12) United States Patent
Yoo et al.

(10) Patent No.: US 9,385,802 B2
(45) Date of Patent: Jul. 5, 2016

(54) MULTI-HOP RELAY MARITIME COMMUNICATION APPARATUS

(71) Applicant: Electronics and Telecommunications Research Institute, Daejeon-si (KR)

(72) Inventors: Dae Seung Yoo, Busan-si (KR); Hyung Joo Kim, Daejeon-si (KR); Seung Yong Lee, Daejeon-si (KR); Kyong Hee Lee, Daejeon-si (KR); Jin Kyu Choi, Daejeon-si (KR); Gwang Ja Jin, Daejeon-si (KR); Byung Tae Jang, Daejeon-si (KR); Dong Sun Lim, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 0 days.

(21) Appl. No.: 14/540,617

(22) Filed: Nov. 13, 2014

(65) Prior Publication Data

US 2016/0119051 A1    Apr. 28, 2016

(30) Foreign Application Priority Data

Oct. 24, 2014    (KR) .......................... 10-2014-0145508

(51) Int. Cl.
| H04B 7/15 | (2006.01) |
| H04B 7/155 | (2006.01) |
| H04L 12/931 | (2013.01) |
| H04W 84/12 | (2009.01) |

(52) U.S. Cl.
CPC .......... *H04B 7/15507* (2013.01); *H04B 7/1555* (2013.01); *H04L 49/351* (2013.01); *H04W 84/12* (2013.01)

(58) Field of Classification Search
None
See application file for complete search history.

(56) References Cited

U.S. PATENT DOCUMENTS

| 5,875,402 | A * | 2/1999 | Yamawaki | H04B 7/212 370/350 |
| 6,831,921 | B2 * | 12/2004 | Higgins | H04L 12/2856 370/338 |
| 6,847,867 | B1 * | 1/2005 | Elliott | B64G 1/1007 342/357.32 |
| 7,295,806 | B2 * | 11/2007 | Corbett | H04W 16/28 370/274 |
| 7,383,019 | B1 * | 6/2008 | Thorsted | H04W 84/18 340/501 |
| 8,175,532 | B2 * | 5/2012 | Nanda | H01Q 1/246 343/757 |
| 2003/0210671 | A1 * | 11/2003 | Eglin | H04L 12/4641 370/338 |
| 2004/0058678 | A1 * | 3/2004 | deTorbal | H04W 36/32 455/437 |
| 2005/0271128 | A1 * | 12/2005 | Williams | H04L 43/0817 375/222 |

(Continued)

FOREIGN PATENT DOCUMENTS

| KR | 10-574881 B1 | 4/2006 |
| KR | 10-2009-0106450 A | 10/2009 |

*Primary Examiner* — Dominic Rego
(74) *Attorney, Agent, or Firm* — Rabin & Berdo, P.C.

(57) ABSTRACT

A multi-hop relay maritime communication apparatus installed in a ship is disclosed. The maritime communication apparatus includes a first access module configured to comprise a plurality of directional antennas integrally formed; a second access module configured to comprise an omni-directional antenna; and a bridge configured to be connected to the first access module and the second access module via an Ethernet interface.

7 Claims, 11 Drawing Sheets

(56) References Cited

U.S. PATENT DOCUMENTS

| | | | | |
|---|---|---|---|---|
| 2007/0057845 A1* | 3/2007 | Miura | ............... | H01Q 21/205 343/700 MS |
| 2007/0146162 A1* | 6/2007 | Tengler | ............... | G08G 1/0962 340/905 |
| 2008/0070582 A1* | 3/2008 | Cai | ............... | H04B 7/15542 455/450 |
| 2008/0304422 A1* | 12/2008 | Bejerano | ............... | H04L 45/02 370/252 |
| 2009/0295626 A1* | 12/2009 | Su | ............... | G06F 17/30241 342/26 C |
| 2010/0283684 A1* | 11/2010 | Rabinovich | ............... | H01Q 1/3275 343/700 MS |
| 2011/0018664 A1* | 1/2011 | Ozeki | ............... | H01F 1/0552 335/302 |
| 2011/0116386 A1* | 5/2011 | Blanchard | ............... | H04B 7/155 370/242 |
| 2013/0127589 A1* | 5/2013 | Canora | ............... | H04N 7/181 340/5.1 |
| 2013/0163516 A1 | 6/2013 | Baek et al. | | |
| 2014/0218173 A1* | 8/2014 | Long | ............... | G06K 17/00 340/10.1 |
| 2015/0116155 A1* | 4/2015 | Chibane | ............... | H01Q 1/1257 342/372 |

\* cited by examiner (a)          (b)

| BRIDGE ETHERNET INTERFACE | | EXTERNAL MODULE | | DESCRIPTION |
|---|---|---|---|---|
| ETHERNET INTERFACE | IP | MODULE | IP | |
| eth0 | 10.x.x.x | TAM | 10.0.0.1 ~ 10.0.0.4 10.0.0.11 ~10.0.0.14 | TERRESTRIAL ACCESS MODULE INTERFACE |
| eth1 | | LAM | 10.0.0.101 ~ 10.0.0.106 | LANDWARD ACCESS MODULE INTERFACE |
| eth2 | | SAM | 10.0.0.201 | SEAWARD ACCESS MODULE INTERFACE |
| eth3 | | IAM | 10.x.x.x | INTRA-SHIP ACCESS MODULE INTERFACE |

MULTI-HOP RELAY MARITIME COMMUNICATION APPARATUS

CROSS-REFERENCE TO RELATED APPLICATION(S)

This application claims priority from Korean Patent Application No. 10-2014-0145508, filed on Oct. 24, 2014, in the Korean Intellectual Property Office, the disclosure of which is incorporated herein by reference in its entirety.

BACKGROUND

1. Field

The following description relates to a wireless communication apparatus, and more particularly, to a maritime wireless communication apparatus.

2. Description of the Related Art

As maritime communication is a very old form of communication, it has evolved slowly compared to other communication technologies since it is difficult to build the wired/wireless communication infrastructure at sea. With the recent rapid advance of communication technology, however, maritime communication is also in the process of being modernized. Under the leadership of International Maritime Organization (IMO), e-Navigation policy has been internationally pursued in an effort to provide safety and security at sea and also protect marine environment by electronically collecting, integrating, exchanging, representing, and analyzing maritime information on ships and shores, and the importance of Ship to Ship, Ship to Shore (4S) communication has been underscored.

Although being equipped with a VHF communication device, most maritime ships generally depend on an analog voice-based communication, except when transmitting a text message, and ocean-going sailing ships have to rely on low-speed, yet costly satellite communications. Most small fishing vessels, which account for the majority of vessels, have operated without any communication devices to ensure minimum safety at the risk of human lives. Many ships operate offshore, but it is difficult for them to be provided with various services from land since there is no maritime wideband digital communication network. Also, although the existing land communication networks, such as the cellular phone networks, are used for maritime communication, they have, however, limited communication range, and it would be problematic for the ships sailing to various areas to use such networks, so that it is not easy to actively utilize the land communication networks.

Research on the modernization of maritime communications has been recently conducted, including development of ITU-R M. 1842-1-based maritime digital VHF wireless communication system and the application of WiMAX Mobile Multi-hop Relay (MMR) technology or wireless local access network (LAN) technology to the maritime communication. The modernization of the maritime communication that relies on an analog voice-based communication to a digital data communication is in progress.

Technologies for new maritime broadband wireless communication infrastructures may relate to a satellite communication, the existing maritime communication, and a terrestrial communication. It is fundamentally hard to lower the price of the satellite communication, or to increase the speed of the existing maritime communication. In addition, the terrestrial communication technology that uses ultra-high frequency (UHF)/SHF bands may have problems regarding distance range, whereas such problems may be overcome by expanding the distance range through multi-hop relay technology, the high-performance amplifier development and use of directional antennas.

In the application of the terrestrial broadband wireless communication technology to the maritime communication, there is a problem in that a frequency band greater than UHF band used for terrestrial communications has a distance range shorter than MF, HF, and VHF frequency bands used for maritime communications. To alleviate the problems, a directional antenna may be used, rather than an omni-directional antenna, so as to extend the transmission range and simultaneously improve space reuse gain. However, since the directional antenna emits strong radio waves only in a certain direction and has characteristic sensitivity that is increased with respect to radio waves from a certain direction, the directional antenna has been used for Point-to-Point (P2P) communication between fixed stations in terrestrial long distance communication, but it is not suitable for Point-to-Multipoint (P2M) communication between ships sailing at sea.

RELATED ART DOCUMENT

Patent Application

Korean Patent No. 10-0574881 (registered on Apr. 21, 2006)

SUMMARY

The following description relates to a multi-hop relay maritime communication apparatus that is capable of increasing a communication range between ships in motion in a maritime environment where a fixed communication infrastructure is difficult to build.

In one general aspect, there is provided a multi-hop relay maritime communication apparatus installed in a ship, the multi-hop relay maritime communication apparatus including: a first access module configured to comprise a plurality of directional antennas integrally formed; a second access module configured to comprise an omni-directional antenna; and a bridge configured to be connected to the first access module and the second access module via an Ethernet interface.

The first access module may be for communication with an upper-level ship that is located closer to a shore than the ship with the apparatus installed.

The second access module may be for communication with a lower-level ship that is located further away to sea than the ship with the apparatus installed.

The plurality of directional antennas of the first access module may be arranged at a predetermined interval in order to cover all directions.

The first access module may further include an omni-directional antenna that is integrally formed with the plurality of directional antennas.

The first access module may be for a station.

The first access module may be a WiFi communication module.

The second access module may be an access point.

The second access module may be a wireless local area network (WLAN) access point.

The multi-hop relay maritime communication apparatus may further include a third access module configured to access a terrestrial communication network and be connected to the bridge through an Ethernet interface.

The third access module may access a terrestrial communication network.

BRIEF DESCRIPTION OF THE DRAWINGS

FIG. 11 is a diagram illustrating Ethernet interface and IP allocation to the bridge and access modules.

Figure 1:
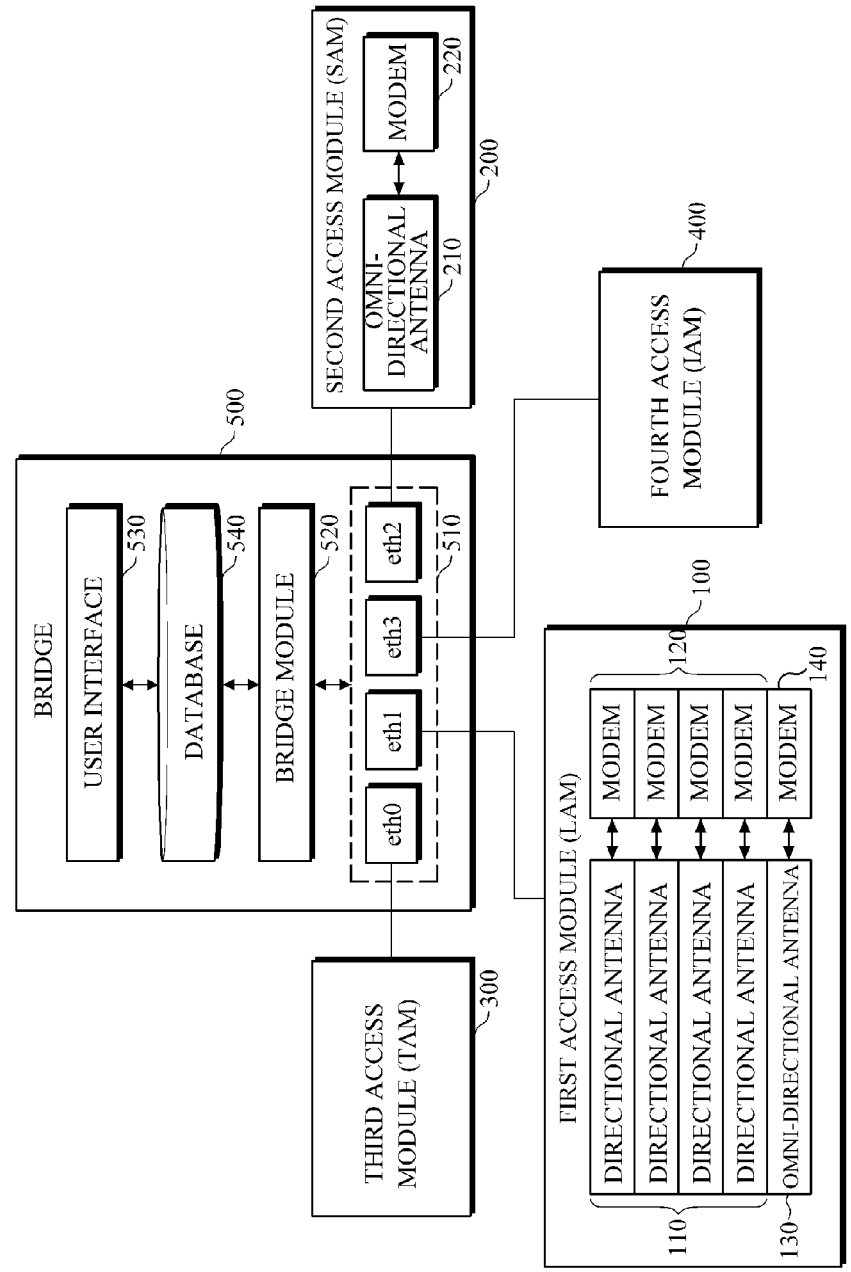
FIG. 1 is a block diagram of a multi-hop relay maritime wireless communication apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram of a multi-hop relay maritime wireless communication apparatus according to an exemplary embodiment. Referring to FIG. 1, the multi-hop relay maritime wireless communication apparatus 1000 may include a first access module 100, a second access module 200, a third access module 300, a fourth access module 400, and a bridge 500.

The first access module 100 as a landward access module (LAM) may be a wireless local area network (WLAN) station. The first access module 100 may communicate with a ship (hereinafter referred to as an "upper-level ship") that is located closer to the shore than the ship equipped with the apparatus 1000. In addition, the first access module 100 may be a WiFi communication module.

The second access module 200 as a seaward access module (SAM) may be a WLAN access point. The second access module 200 may communicate with a ship (hereinafter referred to as a "lower-level ship") that is located further away to sea than the ship equipped with the apparatus 1000. The second access module 200 may be a WiFi communication module.

The third access module 300 as a terrestrial access module (TAM) may be a long-term evolution (LTE) module or a wideband code division multiple access (WCDMA) module. The third access module 300 may directly communicate with the terrestrial communication network, for example, WCDMA or LTE network. In addition, the third access module 300 may include a plurality of LTE/WCDMA communication modules.

The fourth access module 400 as an intra-ship access module may be an intra-ship Ethernet. For long-distance communications, the first access module 100 to the third access modules 300 may be installed at the highest point possible.

The first access module 100 may be a module for communication connection to an upper-level ship, and include a plurality of directional antennas 110 and modems 120 for the directional antennas. The plurality of directional antennas 110 may be formed integrally, and may be arranged at a predetermined interval from each other to cover all directions. In addition, the first access module 100 may further include an omni-directional antenna 130 and a modem 140 for the omni-directional antenna wherein the omni-directional antenna 130 and the modem 140 are formed integrally with the directional antennas 110. The second access module 200 may be a module for communication connection to a lower-level ship. The second access module 200 may include an omni-directional antenna 210 and a modem 220 for the omni-directional antenna 210.

The bridge 500 is installed in the ship, together with the above access modules, thereby forming a maritime communication station. The bridge 500 may be installed in a communication room or a bridge of the ship, and may be connected to the first access module 100, the second access module 200, the third access module 300, and the fourth access module 400 via an Ethernet interface.

In addition, an upstream/downstream link between the third access module 300 and the second access module and an upstream/downstream link between the third access module 300 and the fourth access module 400 are routed to a heterogeneous network, and upstream/downstream link between the second access module and the first access module 100 and upstream/downstream link between the first access module 100 and the fourth access module 400 are bridged or routed to a homogeneous network.

As shown in FIG. 1, the bridge 500 may include four Ethernet interfaces eth0, eth1, eth2, and eth3 for interface with the first to fourth access modules 100, 200, 300, and 400.

FIG. 11 shows Ethernet interface and IP allocation to the bridge and access modules. For all maritime communication stations, private IP (Class A, 10.x.x.x) is allocated to a corresponding bridge from an operating server, and the allocated private IP is used as a representative IP of the corresponding maritime communication station, and fixed private IP (Class C) for use is allocated to the access module that is connected to the bridge, and the internal Ethernet interfaces of the bridge.

As shown in FIG. 1, the bridge 500 may include an access module interface 510 and a bridge module 520. The access module interface 510 may include a plurality of Ethernet interfaces eth0, eth1, eth2, and eth3. As shown in FIG. 1, the first access module 100 is connected to Ethernet interface eth1, the second access module 200 is connected to Ethernet interface eth2, the third access module 300 is connected to Ethernet interface eth0, and the fourth access module 400 is connected to Ethernet interface eth3. The bridge module 520 may perform control and information collection with respect to the access modules, and heterogeneous and homogeneous network bridging, maritime channel management, and so forth. Additionally, the bridge module 520 may function as a dynamic host configuration protocol (DHCP) relay agent, network address translation (NAT), and a simple network management protocol (SNMP) manager. Further, the bridge 500 may further include a user interface 530 for changing setting information, referring status information, and setting a manager account and a database 540 to store setting information and status information.

Figure 2:
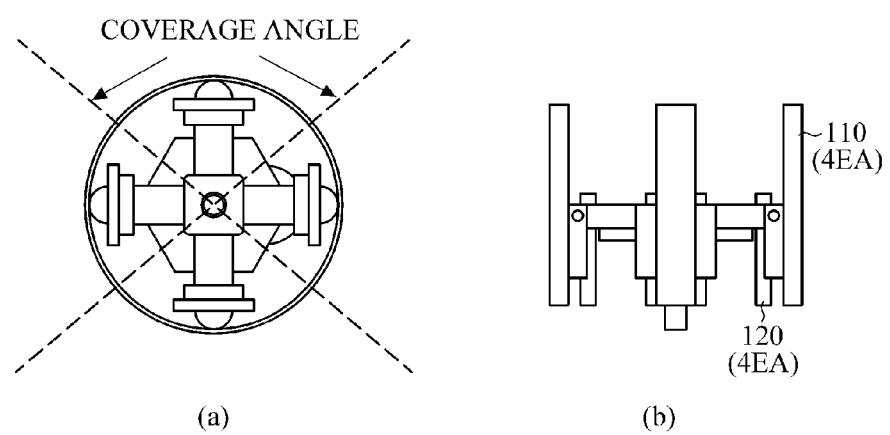
FIG. 2 is a diagram illustrating an example of directional antennas.

FIG. 2 is a diagram illustrating an example of directional antennas. Each directional antenna may cover an arc of 90 degrees. In this case, in order to cover 360 degrees in all directions, four directional antennas 110 may be arranged at a predetermined interval as shown in FIG. 2(a). The directional antenna modem 120 may be formed integrally as shown in FIGS. 2(a) and (b).

Figure 3:
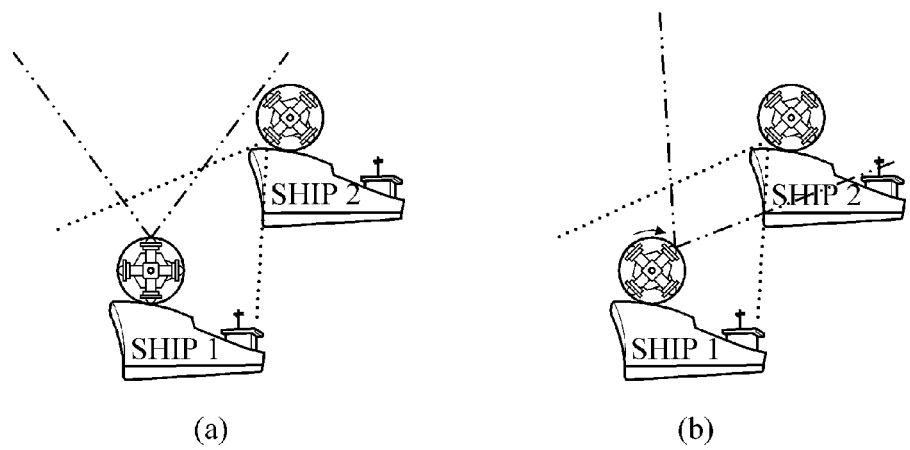
FIG. 3 is a diagram illustrating an example of communication status of ships with directional antennas.

FIG. 3 is a diagram illustrating an example of communication status of ships with directional antennas. Referring to FIG. 3(a), a direction of an antenna of ship 2 is aligned with the direction of an antenna of ship 1, whereas the direction of an antenna of ship 1 is misaligned with the direction of the antenna of ship 2, so that the communication therebetween cannot be established. However, when the direction of an antenna of ship 1 becomes aligned with the direction of an antenna of ship 2, ship 1 and ship 2 can communicate with each other. That is, when the direction of the antenna of ship 1 and the direction of the antenna of ship 2 are aligned to each other, ship 1 and ship 2 can finally communicate with each other.

Figure 4:
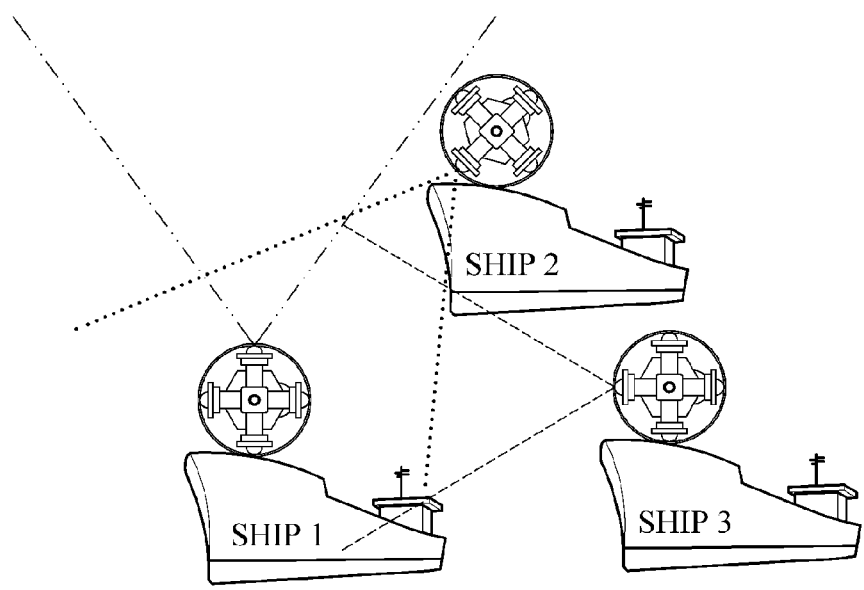
FIG. 4 is a diagram illustrating an example of point-to-multipoint (P2MP) communication status of ships with directional antennas.

FIG. 4 is a diagram illustrating an example of point-to-multipoint (P2MP) communication status of ships with directional antennas. Ship 1 and ship 3 have the antennas aligned in the same direction to each other, thereby enabling communications therebetween. However, as to ship 1 and ship 2, directions of their antennas are not aligned to each other, so that ship 1 and ship 2 cannot communicate with each other. If directions of antennas of ship 1 and ship 2 are aligned to each other in order to enable communications therebetween, communication between ship 1 and ship 3 is disabled.

Figure 5:
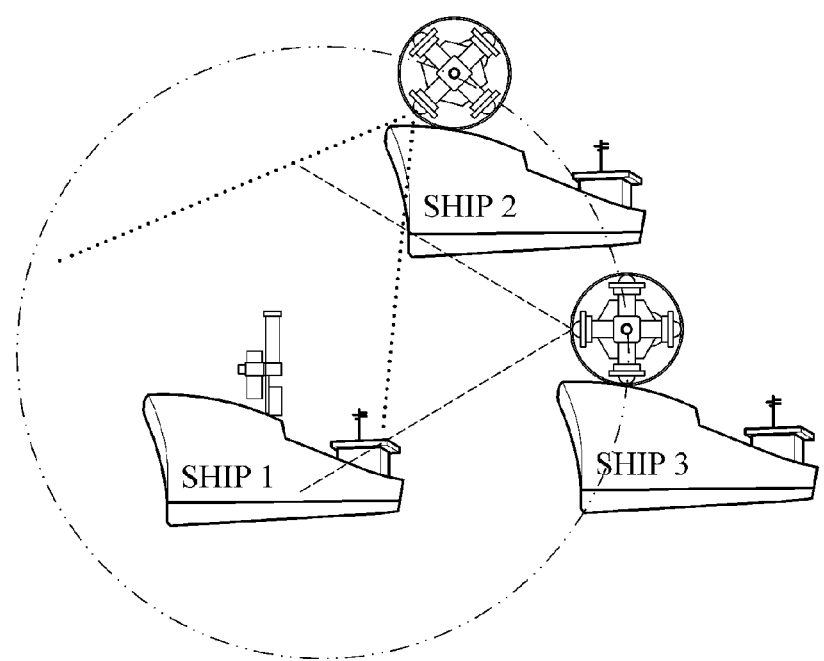
FIG. 5 is a diagram illustrating an example of PMP communications between a ship with an omni-directional antenna and ships with directional antennas.

FIG. 5 is a diagram illustrating an example of PMP communications between a ship with an omni-directional antenna and ships with directional antennas. Ship 1 has an omni-directional antenna, and ship 2 and ship 3 have a plurality of directional antennas. Although the omni-directional antenna of ship 1 has a short distance range, ship 1 enables to establish P2MP communication with ship 2 and ship 3.

Figure 6:
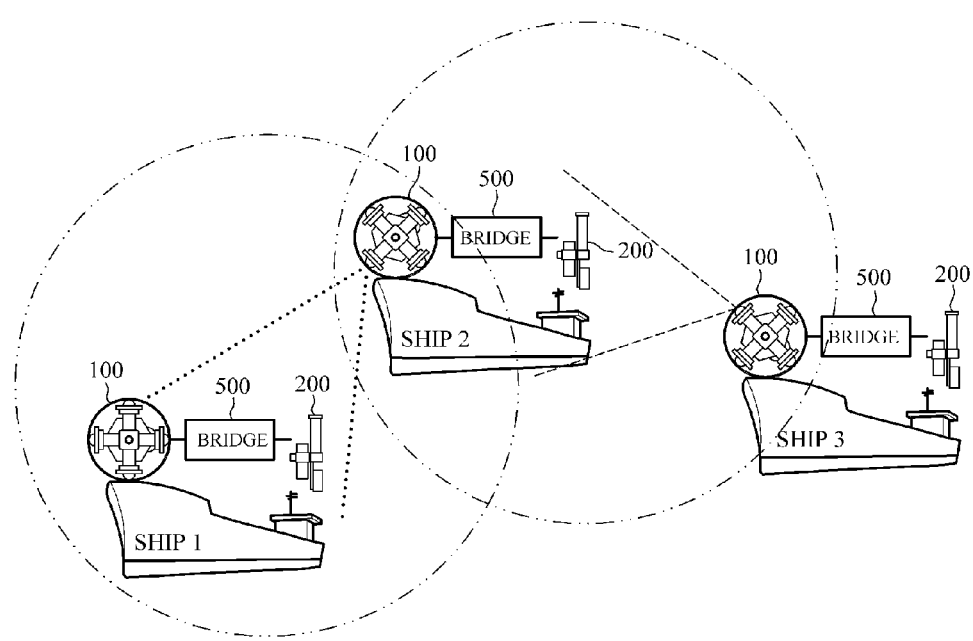
FIG. 6 is a diagram illustrating an example of multi-hop relay communication between ships.

FIG. 6 is a diagram illustrating an example of multi-hop relay communication between ships. Ship 1, ship 2, and ship 3, each, have a maritime communication apparatus (a maritime communication station) that include a first access module 100, a second access module 200 and a bridge 500 that connects the first access module 100 and the second access module 200. The first access module 100 includes a combination of a plurality of directional antennas for access to an upper-level ship in multi-hop relay communication, and the second access module 200 includes a combination of omni-directional antennas for access to multiple lower-level ships in the multi-hop relay communication. Ship 1 and ship 2 may communicate with each other through the directional antenna and the omni-directional antenna, respectively. In addition, ship 2 and ship 3 communicate with each other through the omni-directional antenna and the directional antenna, respectively. Accordingly, the multi-hop relay communication can be achieved.

Figure 7:
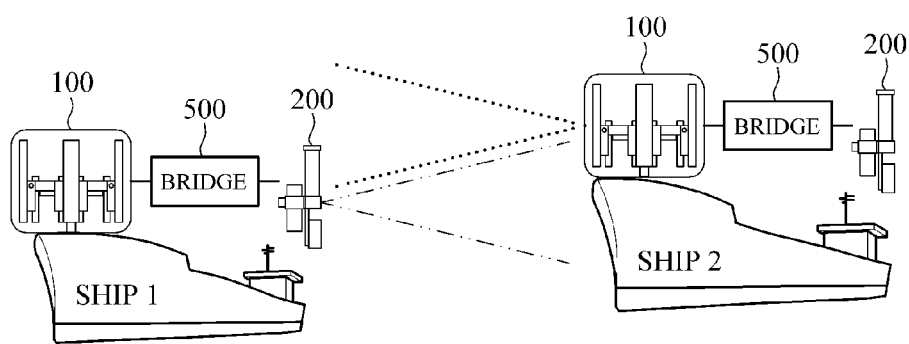
FIG. 7 is a diagram illustrating an example of communication status according to difference in an angle of elevation between ships.
Figure 7:
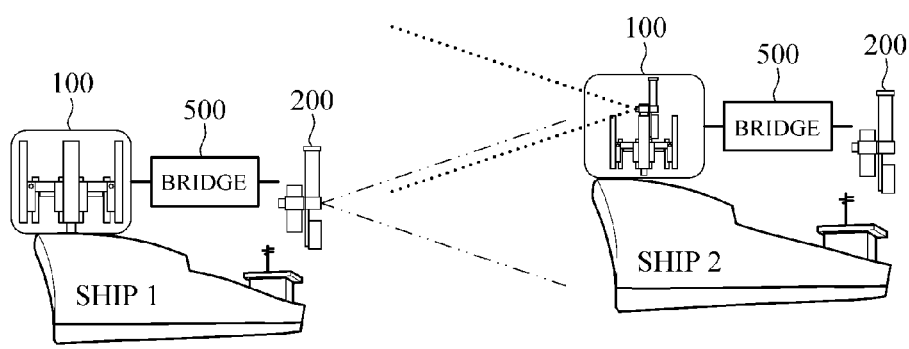

FIG. 7 is a diagram illustrating an example of communication status according to difference in an angle of elevation between ships. In FIG. 7(a), a maritime communication apparatus each installed in ship 1 and ship 2 is the same as in FIG. 6, and ship 1 and ship 2 cannot communicate with each other due to a difference in an angle of elevation. The difference in an angle of elevation between a transmission antenna and a reception antenna may occur due to a ship movement (for example, rolling and pitching) and a difference in a height of an antenna from the sea level. As the distance between ships decreases, the quality of a signal can be even more affected by the differences in angles of elevation. FIG. 7(b) illustrates an example of solution to a difference in an angle of elevation. In FIG. 7(b), an omni-directional antenna with a greater angle of elevation than that of the directional antennas is added to the combination of the plurality of directional antennas of the first access module 100. Since a problem related to the angle of elevation arises mostly when ships are close to each other, it can be overcome by an omni-directional antenna, regardless of a distance range. Although FIG. 7(b) shows that the first access module 100 of ship 2 has the omni-directional antenna added to the combination of a plurality of directional antennas, the first access module 100 of ship 1 may also have the same configuration as the first access module 100 of ship 2.

Figure 8:
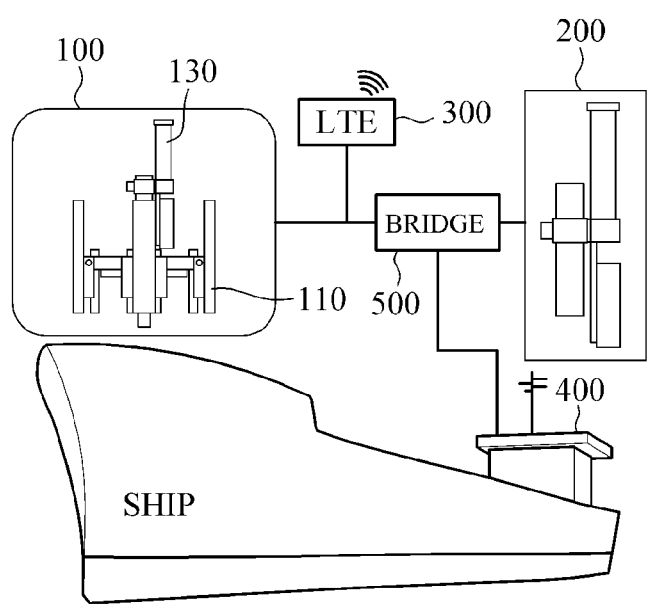
FIG. 8 is a diagram illustrating a multi-hop relay maritime communication apparatus according to an exemplary embodiment.

FIG. 8 is a diagram illustrating a multi-hop relay maritime communication apparatus according to an exemplary embodiment. Referring to FIG. 8, the maritime communication apparatus includes a first access module 100, a second access module 200, a third access module 300, a fourth access module 400, and a bridge 500 that is connected to the first to fourth access modules through Ethernet interfaces. In addition, the first access module 100 may include an antenna array consisting of directional antennas 110 and an omni-directional antenna 130, and the second access module 200 may include an omni-directional antenna 210.

Figure 9:
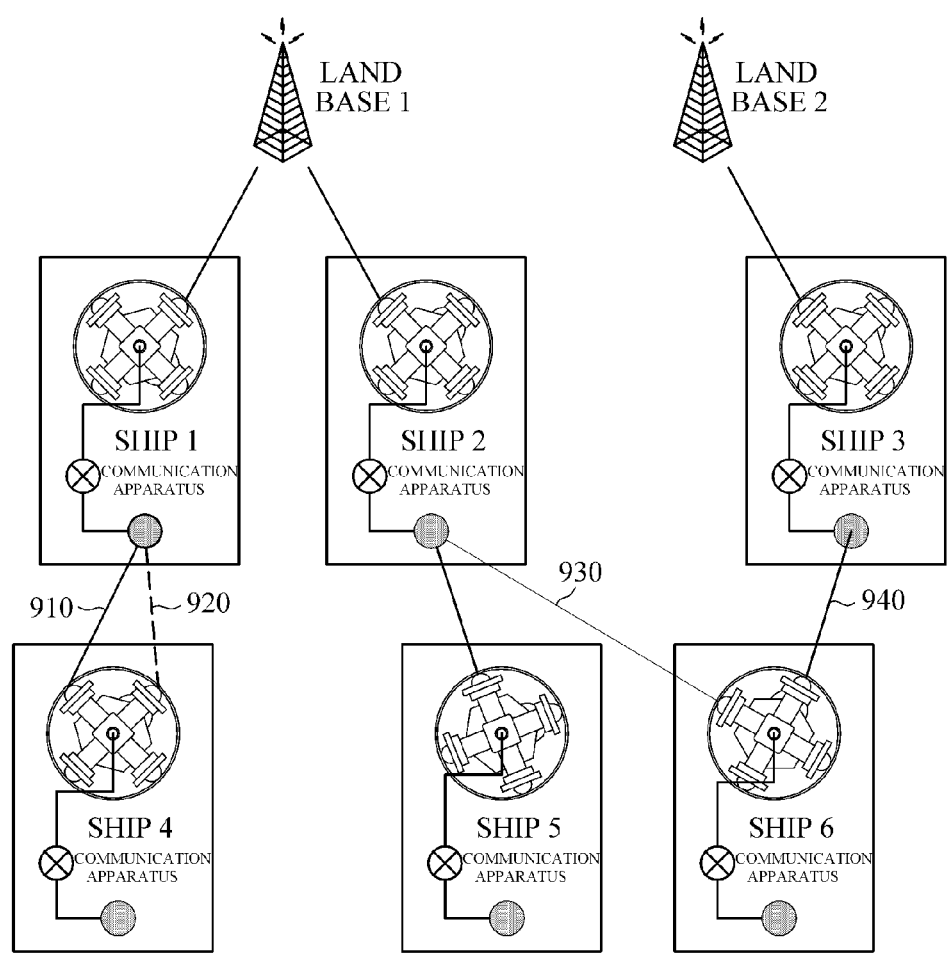
FIGS. 9 and 10 are diagrams illustrating examples of a maritime communication network.
Figure 10:
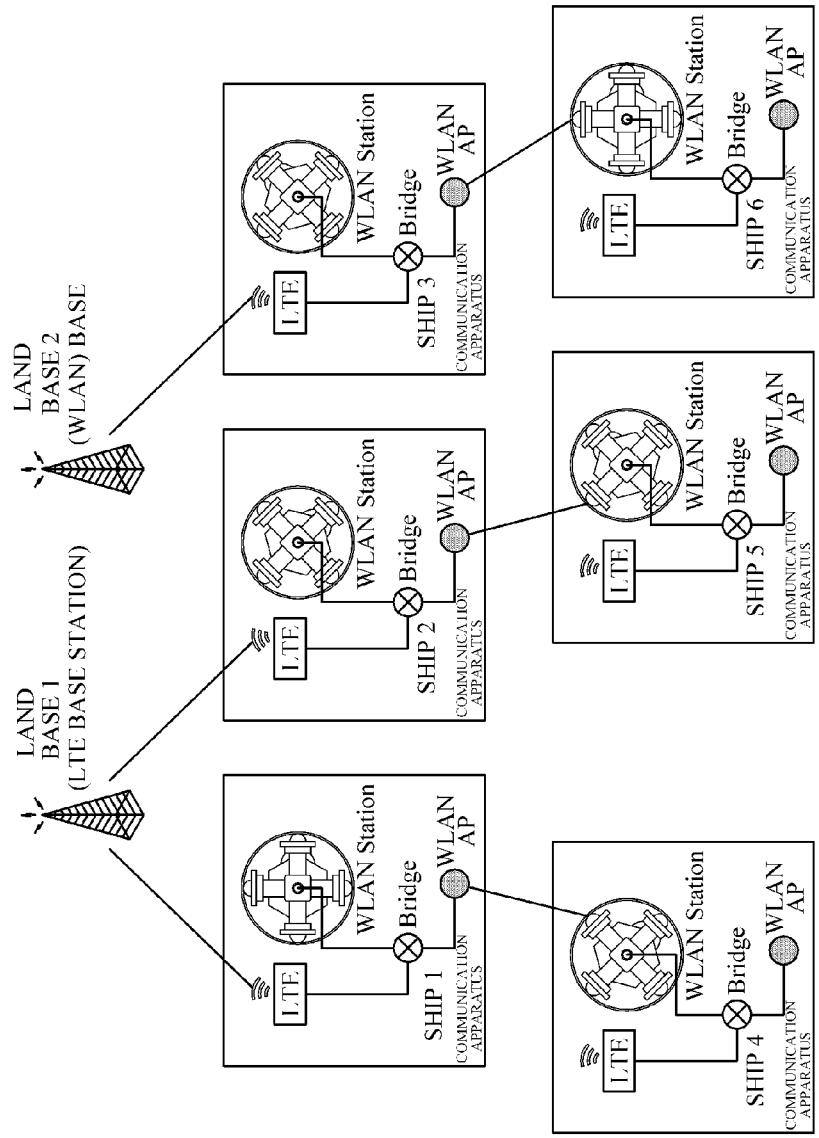

FIGS. 9 and 10 are diagrams illustrating examples of a maritime communication network. Reference numerals 910, 920, 930, and 940, each, denote a multi-link connection. Link connection 910 and link connection 920 are active-standby connections with the same parent. Two directional antennas among the combination of a plurality of directional antennas of ship 4 are available to be connected to ship 1, wherein the link connection 910 is a currently active connection, the link connection 920 is a standby connection, and rapid switching between these two link connections is ensured when the direction of the antenna changes due to the moving or turning of the ships. Link connection 930 and link connection 940 are both active connections, which have a different parent. Each of two directional antennas, out of a plurality of directional antennas of ship 6, can be connected to ship 2 and ship 3, respectively. In this case, the connection is an active connection. As such, in an active-active connection, load can be distributed and transmission speed can be improved through load balancing of network traffic.

In FIG. 10, ship 1, ship 2, and ship 3 are located close to a land base, and thereby able to access the terrestrial Internet by direct connection to the land base, and ship 4, ship 5, and ship 6 all access the terrestrial Internet via the relay of other ships. The communication scheme between the land base and the ship and the communication scheme between ships may be differently configured. In addition, land base 1 and land base 2 may employ a different communication scheme. For example, land base 1 may be an LTE base station, land base 2 may be a WLAN AP, and communications between ships may be carried out through wireless LAN. FIG. 10 is a diagram illustrating an example of the above network.

According to a multi-hop relay maritime communication apparatus in accordance with an exemplary embodiment, it is possible to extend the communication range between ships in a maritime environment where fixed communication infrastructure is difficult to build.

In addition, additional infrastructure and operating costs for providing the wideband wireless mobile communication service are not needed, and thus the communication cost of ships can be reduced.

Moreover, the communication cost of ships can be more reduced as compared to satellite communications, since terrestrial wireless communication can be used even at sea.

Further, it is possible to overcome communication failure due to a difference in an angle of elevation.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-hop relay maritime communication apparatus for installation in a ship, the multi-hop relay maritime communication apparatus comprising:
    a first access module, including a plurality of directional antennas integrally formed, configured to communicate with an upper-level ship that is located closer to a shore than the ship;
    a second access module, including an omni-directional antenna, configured to communicate with a lower-level ship that is located further away from the shore than the ship;
    a third access module configured to access a terrestrial communication network; and
    a bridge configured to connect the first, second and third access modules via an Ethernet interface.

2. The multi-hop relay maritime communication apparatus of claim 1, wherein the plurality of directional antennas of the first access module are arranged at a predetermined interval in order to cover all directions.

3. The multi-hop relay maritime communication apparatus of claim 1, wherein the first access module further comprises an omni-directional antenna that is integrally formed with the plurality of directional antennas.

4. The multi-hop relay maritime communication apparatus of claim 1, wherein the first access module is for a station.

5. The multi-hop relay maritime communication apparatus of claim 4, wherein the first access module is a WiFi communication module.

6. The multi-hop relay maritime communication apparatus of claim 1, wherein the second access module is an access point.

7. The multi-hop relay maritime communication apparatus of claim 6, wherein the second access module is a wireless local area network (WLAN) access point.

* * * * *